(12) United States Patent
Chew

(10) Patent No.: US 9,626,376 B1
(45) Date of Patent: Apr. 18, 2017

(54) LOCAL AREA NETWORK DISTRIBUTED STORAGE

(71) Applicant: Western Digital Technologies, Inc., Irvine, CA (US)

(72) Inventor: David W. Chew, San Juan Capistrano, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 393 days.

(21) Appl. No.: 14/244,672

(22) Filed: Apr. 3, 2014

Related U.S. Application Data

(60) Provisional application No. 61/940,208, filed on Feb. 14, 2014.

(51) Int. Cl.
  *G06F 17/00* (2006.01)
  *G06F 17/30* (2006.01)
(52) U.S. Cl.
  CPC .............................. *G06F 17/30174* (2013.01)
(58) Field of Classification Search
  CPC .................................................. G06F 17/30174
  USPC ......................................................... 707/617
  See application file for complete search history.

(56) References Cited

U.S. PATENT DOCUMENTS

| | | | |
|---|---|---|---|
| 5,982,520 A * | 11/1999 | Weiser | G06F 1/1626 398/107 |
| 6,499,054 B1 | 12/2002 | Hesselink et al. | |
| 6,732,158 B1 | 5/2004 | Hesselink et al. | |
| 7,120,692 B2 | 10/2006 | Hesselink et al. | |
| 7,454,443 B2 | 11/2008 | Ram et al. | |
| 7,467,187 B2 | 12/2008 | Hesselink et al. | |
| 7,546,353 B2 | 6/2009 | Hesselink et al. | |
| 7,587,467 B2 | 9/2009 | Hesselink et al. | |
| 7,600,036 B2 | 10/2009 | Hesselink et al. | |
| 7,788,404 B2 | 8/2010 | Hesselink et al. | |
| 7,917,628 B2 | 3/2011 | Hesselink et al. | |
| 7,934,251 B2 | 4/2011 | Hesselink et al. | |
| 8,004,791 B2 | 8/2011 | Szeremeta et al. | |
| 8,255,661 B2 | 8/2012 | Karr et al. | |
| 8,285,965 B2 | 10/2012 | Karr et al. | |
| 8,341,117 B2 | 12/2012 | Ram et al. | |
| 8,341,275 B1 | 12/2012 | Hesselink et al. | |
| 8,352,567 B2 | 1/2013 | Hesselink et al. | |
| 8,526,798 B2 | 9/2013 | Hesselink | |

(Continued)

OTHER PUBLICATIONS http://www.acerdirect.co.uk/Acer_JZ.JBF00.001_IEEE_802. 11n_Wi-Fi_Adapter_JZ.JBF00.001/version.asp, (Downloaded on Sep. 30, 2013) 2 pages.

(Continued)

*Primary Examiner* — Rehana Perveen
*Assistant Examiner* — Tiffany Thuy Bui
(74) *Attorney, Agent, or Firm* — Chang & Hale LLP

(57) ABSTRACT

Systems and methods are disclosed for managing distributed data storage. A data storage device is configured to operate in at least two modes of operation, including a first mode, in which the data storage device may sync a file directory with a corresponding file directory of a separate data storage device when the data storage devices are connected over a broadcast connection in a first local area network (LAN). In a second mode of operation, the data storage device may connect to a host device over a dedicated point-to-point connection over a second LAN when the data storage device is not connected to the first LAN.

12 Claims, 4 Drawing Sheets

(56) References Cited

U.S. PATENT DOCUMENTS

| | | | |
|---|---|---|---|
| 8,631,284 B2 | 1/2014 | Stevens | |
| 8,631,415 B1 * | 1/2014 | Nadathur | G06F 9/5088 |
| | | | 712/10 |
| 8,646,054 B1 | 2/2014 | Karr et al. | |
| 8,661,507 B1 | 2/2014 | Hesselink et al. | |
| 8,688,797 B2 | 4/2014 | Hesselink et al. | |
| 8,713,265 B1 | 4/2014 | Rutledge | |
| 8,762,682 B1 | 6/2014 | Stevens | |
| 8,780,004 B1 | 7/2014 | Chin | |
| 8,793,374 B2 | 7/2014 | Hesselink et al. | |
| 9,253,814 B1 * | 2/2016 | Moncrief | H04W 76/045 |
| 2005/0144195 A1 | 6/2005 | Hesselink et al. | |
| 2005/0144200 A1 | 6/2005 | Hesselink et al. | |
| 2007/0274271 A1 * | 11/2007 | Jones | H04W 8/005 |
| | | | 370/338 |
| 2011/0201275 A1 * | 8/2011 | Jabara | H04L 12/5692 |
| | | | 455/41.2 |
| 2012/0036041 A1 | 2/2012 | Hesselink | |
| 2012/0149312 A1 * | 6/2012 | Velusamy | H04M 1/72569 |
| | | | 455/68 |
| 2013/0019073 A1 * | 1/2013 | Cok | G06F 11/1456 |
| | | | 711/162 |
| 2013/0077229 A1 | 3/2013 | Tsai et al. | |
| 2013/0212401 A1 | 8/2013 | Lin | |
| 2013/0266137 A1 | 10/2013 | Blankenbeckler et al. | |
| 2013/0268749 A1 | 10/2013 | Blankenbeckler et al. | |
| 2013/0268759 A1 | 10/2013 | Blankenbeckler et al. | |
| 2013/0268771 A1 | 10/2013 | Blankenbeckler et al. | |
| 2014/0095439 A1 | 4/2014 | Ram | |
| 2014/0169921 A1 | 6/2014 | Carey | |
| 2014/0173215 A1 | 6/2014 | Lin et al. | |
| 2014/0180826 A1 * | 6/2014 | Boal | G06Q 30/0245 |
| | | | 705/14.66 |
| 2014/0195640 A1 * | 7/2014 | Kaiser | G06F 17/30581 |
| | | | 709/217 |
| 2014/0335823 A1 * | 11/2014 | Heredia | H04L 12/5895 |
| | | | 455/411 |

OTHER PUBLICATIONS

Netgear Installation Guide, "A6200 WiFi USB Adapter", Sep. 19, 2012 (Downloaded on Sep. 19, 2012) 2 pages.

Jiang Li, "Share Patriot Wireless Storage Expansion Adapter Digitizing Measurement" http://mst.zol.com.cn/378/3781128.html, Jun. 7, 2013,(Downloaded on Sep. 30, 2013) 22 pages.

David W. Chew, U.S. Appl. No. 13/918,895, filed Jun. 14, 2013, 19 pages.

* cited by examiner

LOCAL AREA NETWORK DISTRIBUTED STORAGE

RELATED APPLICATION

This application claims the benefit of priority under 35 U.S.C. §119(e) of U.S. Provisional Application No. 61/940,208, filed on Feb. 14, 2014, and entitled "Local Area Network Distributed Storage," the disclosure of which is hereby incorporated by reference in its entirety.

BACKGROUND

Field

This disclosure relates to data storage systems. More particularly, the disclosure relates to systems and methods for data storage distribution over local area networks.

Description of Related Art

Distribution of data storage across one or more data storage devices can provide increased data security through data redundancy. Network-attached storage devices provide access to data over computer networks.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Network-attached storage (NAS) drives/systems can provide file-level data storage over a computer network, wherein access to the stored data is accessible to a group of clients. For example, a NAS may include hardware, software, or a combination of such elements, configured such that the NAS operates as a file server. NAS devices/systems can provide a convenient mechanism for sharing data among multiple computers. As compared to traditional file servers, benefits of NAS devices/systems may include faster data access, easier administration, and/or simpler configuration.

Figure 1:
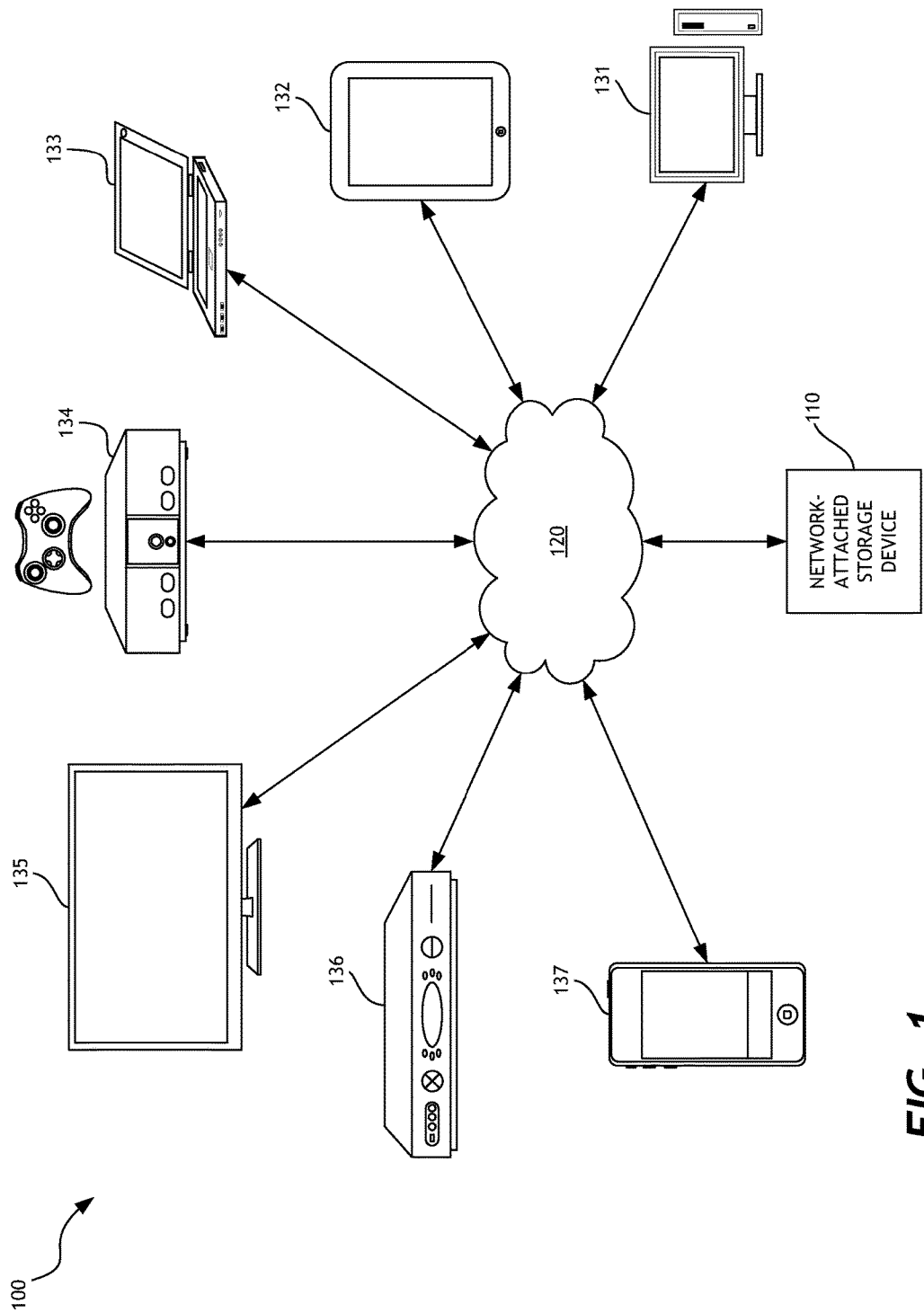
FIG. 1 is a diagram of a networked data storage system according to an embodiment.

FIG. 1 is a diagram illustrating an embodiment of a NAS system 100, in which a network-attached storage device (NAS) 110 is communicatively coupled to one or more client devices in order to provide file-based data storage services to other devices on the network 120. The network may be a local area network (LAN), a wide area network (WAN) (e.g., the Internet), or other type of computer network.

In certain embodiments, the NAS 110 provides only file-based services. Alternatively, the NAS 110 may be configured to run software to provide additional server functionality. In certain embodiments, the NAS 110 may be configurable over the network 120 by a client device interface, such as a web browser of a mobile or desktop computing device. For example, a low-level operating system may be implemented in the NAS, such as FreeNAS, which is an open source NAS solution designed for commodity PC hardware. The NAS 110 may provide access to files using one or more network file-sharing protocols, such as NFS, SMB/CIFS, AFP, or the like.

Although NAS systems/devices can provide various benefits, as described above, in certain configurations, such systems may be associated with various issues and/or drawbacks. For example, when data storage is consolidated in a single drive, physical damage or other data loss, or loss of access to the drive, can be problematic or even catastrophic. Furthermore, with respect to Internet-based, or other broadcast network communications, data uploading/downloading between client devices and the NAS 110 may be undesirably slow, particularly in situations in which multiple client devices are accessing the NAS 110 at a given time. For example, when streaming video content from the NAS 110 to a networked device, such as a smart TV 135, set-top box 136, tablet computer 132, or other device, bandwidth limitations may necessitate buffering or otherwise impede real-time, or timely, streaming of the video content.

Certain embodiments disclosed herein provide distributed data storage accessible over a computer network, such as a local area network (LAN). For example, as described in further detail below, embodiments disclosed herein may provide for the use of multiple separate data storage devices/drives configured to sync over a computer network, thereby providing data redundancy among the distributed storage devices. Distributed storage devices may include, or be coupled with, one or more wireless transceivers configured to communicate over the LAN according to one or more wireless communication protocols, such as Wi-Fi, Bluetooth, or the like. Certain embodiments may provide for mobility of data outside of the shared data network, as well as relatively easy introduction of new data to the network. Distributed data storage as described herein may be implemented in home or institutional data storage networks.

Example Network-Attached Storage Systems

With further reference to FIG. 1, the network-attached data storage device 110 (e.g., hybrid hard drive, solid-state drive, etc.) may include a controller (not shown) configured to receive data commands and to execute such commands in one or more non-volatile memory arrays of the NAS 110. Such commands may include data read/write commands, and the like. The controller may be configured to receive data commands from a storage interface (e.g., a device driver) residing on a client device/device. Data commands may specify a block address in the NAS 110; data may be accessed/transferred based on such commands.

The NAS 110 can be configured to store data in one or more magnetic recording disks and/or the solid state memory devices/arrays. In an embodiment, the storage device 110 comprises a cable box, a backup disk drive, a media storage unit, a streaming media device, a digital camera, or any other electronic device which may store data that may need to be accessed directly or wirelessly.

In certain embodiments, the NAS can store data received from a client device such that the NAS 110 acts as data storage for the client device. To facilitate this function, the NAS 110 can implement a logical interface. The logical interface can present to the client device memory as a set of logical addresses (e.g., sequential/contiguous addresses) where data can be stored. Internally, the NAS controller may map logical addresses to various physical memory addresses in the non-volatile memory of the NAS 110. Mapping data indicating the mapping of logical addresses to physical memory addresses may be maintained in the NAS 110.

In certain embodiments, the NAS 110 is a single, centralized unit connected to a Wi-Fi router via, for example, an Ethernet cable. One or more of the clients (131-137) may share access to the NAS device 110 via a wide area network (WLAN), such as the Internet. In certain embodiments, data protection is achieved for the NAS 110 using RAID (redundant array of inexpensive disks) technology, wherein multiple disk drive components are contained in the NAS for storing redundant data.

Distributed Storage

Certain embodiments disclosed herein provide for distribution of data over a plurality of data storage drives, such as solid-state drives (SSD), hard disk drives (HDD), hybrid drives, or the like, wherein the data storage drives are coupled to a network, such as a WLAN or LAN. The distributed storage drives may be relatively inexpensive compared to traditional NAS devices. Distributed storage configurations as described herein may provide certain benefits over traditional NAS systems in which data storage is centralized in a single NAS device. For example, common/shared data may be replicated and synchronized among distributed storage devices, thereby providing redundancy and/or reduced data loss exposure compared to data contained in a single (or RAID-configured) centralized NAS device. For example, data stored in one of a plurality of distributed storage devices may be uploaded to other distributed devices over a shared network according to some type of syncing scheme.

Figure 2:
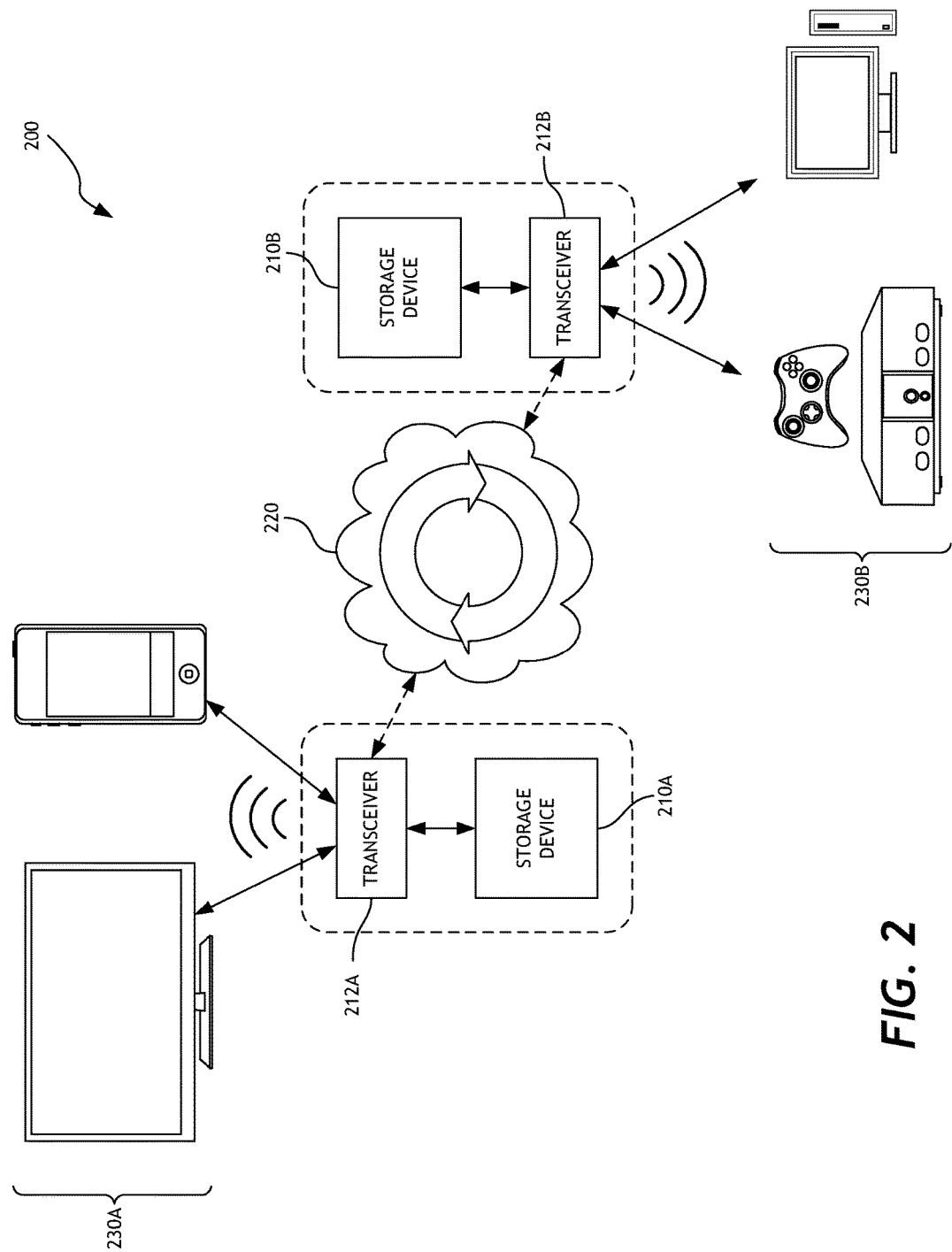
FIG. 2 is a diagram of a networked data storage system according to an embodiment.

FIG. 2 is a diagram of a distributed storage system 200 according to one or more embodiments. The system 200 includes a plurality of storage devices (210A, 210B), each configured to sync locally-stored data with one or more of the plurality of other storage devices over, for example, a local area network (LNA) 220. In certain embodiments, one or more of the plurality of data storage devices is configured to sync with an Internet-based (e.g., "cloud-based") server. The data storage devices (210A, 210B) may comprise hard disk media and/or solid-state media. While certain description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

One or more of the distributed storage devices (210A, 210B) may, for example, may be associated with a wireless transceiver (212A, 212B). For example, in certain embodiments, a storage device comprises a USB-compatible storage drive coupled with a wireless adapter, such as a Wi-Fi adapter. Data storage distribution as shown in FIG. 2 may provide reduced risk of data loss by distributing data in different physical areas of the LAN, with data replicated across the distributed units/devices.

The storage devices (210A, 210B) may be coupled to one or more client devices over a wired or wireless connection. For example, the storage device 210A may be coupled over a Wi-Fi connection to one or more client devices 230A via a Wi-Fi transceiver device 212A. In an embodiment, the transceivers (212A, 212B) provide wireless access to the storage devices (210A, 210B), which may not be configured for wireless access independently. In an embodiment, the transceivers can allow the storage devices to be wirelessly accessible by translating data transmitted through the Wi-Fi protocol into a protocol that the storage devices understand (e.g., USB, Thunderbolt, Serial ATA or the like). In an embodiment, one or more components of the transceiver 212A may be integrated into the storage device 210A. Client access to local storage drives may be executed over a network-shared (STA) connection, or over a dedicated "access-point-only" (AP) connection, wherein a storage drive is connected over a point-to-point connection to the host device.

Syncing of files on one of the distributed storage devices may be performed on a scheduled, periodic, and/or sporadic basis. In an embodiment, syncing is triggered when the storage device connects to the LAN 220. Although the network 220 is generally described herein as a local area network, it should be understood that in certain embodiments, the network 220 may be a wide area network (WAN), such as the Internet. In certain embodiments, syncing is performed only with respect to files and/or folders designated as "shared" data. For example, designation of shared data may be performed over a user interface on a client device, or may be configured in some other manner.

In certain embodiments, more than one client device may be able to access a given storage device simultaneously. In an embodiment, the transceiver 212A may allow the storage device 210A to be discoverable on the network 220. The transceiver 212A may be configured to obtain a network address, such as an IP address, from a router in the network. In an embodiment, the transceiver 212B may utilize TCP/IP and/or IEEE 802.11 protocols.

In certain embodiments, a distributed storage device of the system 200 may be removed from the network 220 and accessed remotely by a client device. For example, a client device may connect remotely to the storage device over a wireless connection using a wireless transceiver connected to the storage device, such as a Wi-Fi broadcasting adapter. When removed from the LAN 220, a storage device (e.g., 210A) may travel with the user and provide local access and performance when away from the LAN. For example, a local wireless (e.g., Wi-Fi) point-to-point connection may be established between the storage device and a client device. Such local access may provide relatively better privacy, performance and/or range than Internet-based remote access, or multipoint LAN connection access. Furthermore, use of the local access through the transceiver 212 may allow for avoidance of internet/cellular charges.

When the storage device is reintroduced into the network 220, it may sync with other distributed devices on the network, such that data stored/removed elsewhere on the network may be uploaded to or removed from the storage device and/or data stored on or removed from the data storage device may be uploaded to or removed from other devices on the network.

As referenced above, distributed storage devices may be configured to switch between operation in a network-shared mode on the LAN 220, or in a dedicated mode, wherein the host and/or data storage devices are substantially isolated from the LAN 220. For example, the shared mode may be suitable for replicating/syncing and/or for accessing bandwidth-insensitive data (e.g. photos, music content, etc.), whereas the dedicated mode may be suitable for serving high-bitrate, bandwidth-sensitive data (e.g. video content). Therefore, the dedicated serving mode may provide improved data transfer performance for bandwidth-sensitive applications.

Wireless Transceiver Adapter

Figure 3:
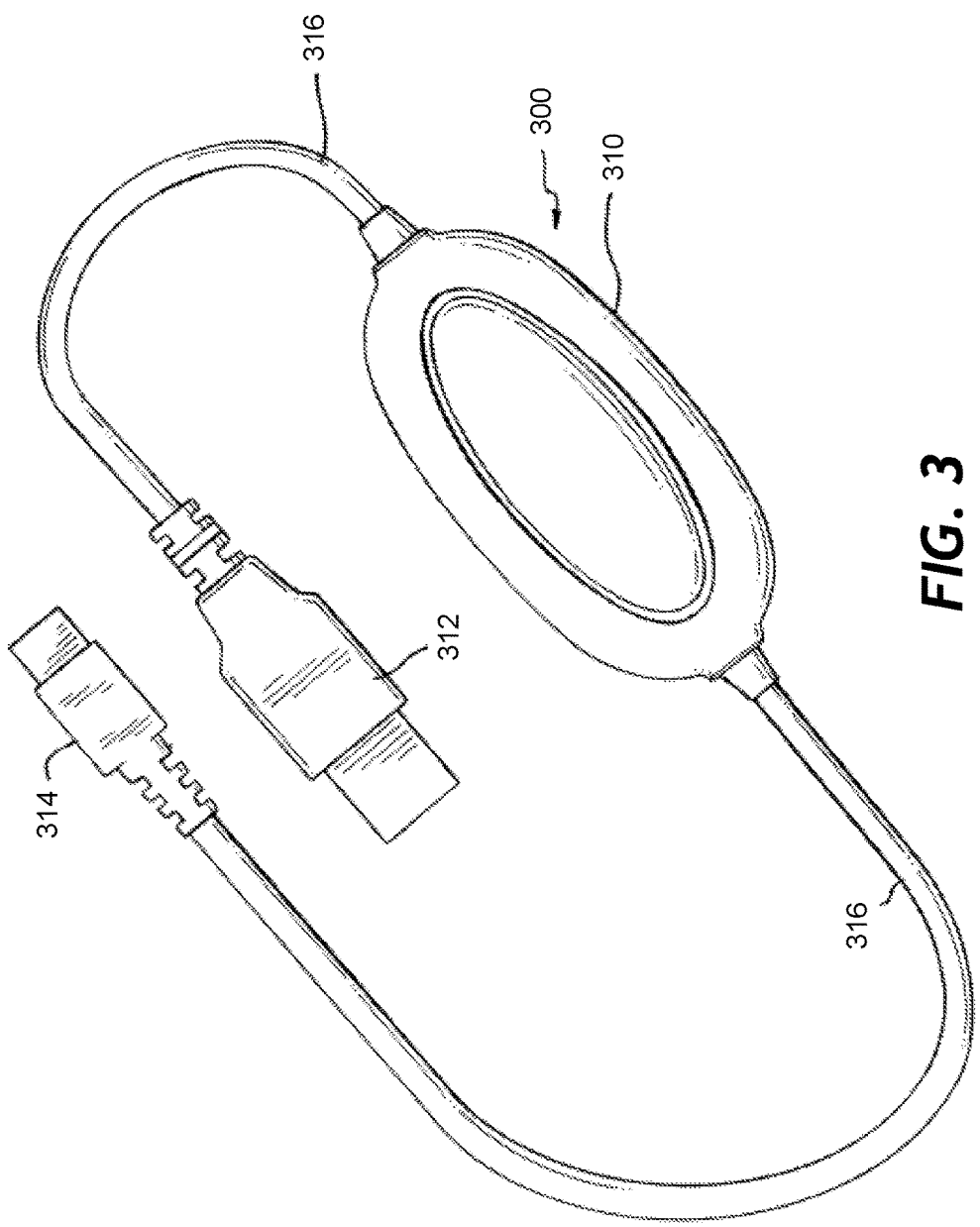
FIG. 3 illustrates a communications cable according to an embodiment.

As described above, certain embodiments may include a data storage device coupled to an external wireless transceiver device, such as a cable, or the like. FIG. 3 illustrates an embodiment of a wireless adapter device 300 configured to be physically connected to a NAS device. For example, the wireless adapter device 300 of FIG. 3 may represent an embodiment of a transceiver unit (212A, 212B) of the system 200 of FIG. 2. Although a particular embodiment of a transceiver adapter/module is depicted in FIG. 3, it should be understood that transceivers as described herein may include one or more features of the wireless adapter device 300 described below, while being embodied in a form other than that illustrated in FIG. 3. For example, the transceiver features described below may be integrated in a data storage device, or an external wireless adapter device may comprise a different size, shape and/or form than that illustrated in FIG. 3.

The wireless adapter device 300 may be configured to be connected to a storage device, a host, and/or a power supply. The host can be, for example, an electronic device which is configured to access data stored in a connected storage device using the wireless adapter device 300. In an embodiment, the host comprises a personal computer, a laptop, a tablet, a mobile phone, a wearable computing device, or any other device which may be configured to access the data stored in the storage device. In an embodiment, the wireless adapter device 300 may be configured to connect to a power supply, such as a car cigarette lighter adapter, car stereo, phone/tablet adapter/charger, airline seats, or other types of power supplies. In an embodiment, the power supply comprises a DC/DC converter or an AC/DC converter.

In an embodiment, the wireless adapter device 300 comprises a wireless access module 310, a first communications interface 313, a second communications interface 314, and one or more cable portions 316. The cable portion 316 may be configured, for example, to connect the wireless access module 310 to the communications interface 312 and the communications interface 314, and to connect the communications interface 312 to the communications interface 314.

The communications interfaces 312 and 314 can comprise, for example, serial bus interfaces such as universal serial bus ("USB") interfaces. In an embodiment, the communications interface 312 may comprise a USB standard-A plug, while the communications interface 314 may comprise a USB micro-B plug, or vice versa. In an embodiment, the communications interface 312 and the communications interface 314 can comprise other types of USB plugs. For example, the communications interface 312 and the communications interface 314 can comprise a USB standard-B plug, a USB mini-A plug, a USB mini-B plug, a USB mini-AB plug, a USB micro-A plug, USB micro-AB plug, or other interface. In an embodiment, the communications interface 312 and the communications interface 314 can utilize a communications protocol or interfaces aside from USB such as other serial bus protocols or interfaces. In some embodiments, the communications interface 312 or the communications interface 314 utilizes a Thunderbolt interface or other type of connection interface.

In an embodiment, the communications interface 312 is configured to be connected to a host or power supply, while the communications interface 314 is configured to be connected to a storage device. In an embodiment, the communications interface 312 is configured to receive data from a serial bus. For example, when the communications interface 312 is connected to a host, the communications interface 312 may receive data from a serial bus. In an embodiment, the communications interface 312 is configured to receive power from a power bus line. For example, when the communications interface 312 is connected to a host, it may receive power from a power bus line.

In an embodiment, when the communications interface 312 is connected to a host, and the communications interface 314 is connected to a storage device, the communications interface 312 may enable direct access to the storage device. Thus, the host may directly access the storage device. In an embodiment, the communications interface 312 may provide data transfer speeds of approximately 3.2 Gbits/s, or greater. In an embodiment, the communications interface 312 may provide data transfer speeds of approximately 10 Gbits/s. In an embodiment, the communications interface 312 may provide data transfer speeds according to a USB 2.0 protocol. In an embodiment, the communications interface 312 may provide data transfer speeds according to a USB 3.0 protocol. In an embodiment, the communications interface 312 may provide data transfer speeds according to a Thunderbolt protocol, or other data transfer speeds may be possible.

In an embodiment, the wireless adapter device 300 includes a wireless access module 310 that is configured to enable wireless access to a distributed data storage device. In the embodiments shown in FIG. 3, the wireless access module 310 comprises an approximately oval shape which is elongated in a direction where the cables of the cable unit 316 may be attached to the wireless access module 310. However, it is understood that the wireless access module 310 may comprise any desirable shape and/or size.

In an embodiment, the wireless access module 310 is configured to be powered by the power received over the communications interface 312. For example, the communications interface 312 can receive power from a power supply unit when the communications interface 312 is connected to the power supply unit. In an embodiment, the wireless access module 310 is configured to be powered only by the power received by the communications interface 312.

In an embodiment, the wireless access module 310 may be configured to be powered by power received over the communications interface 314. For example, the power received at the communications interface 314 from a storage device may be used to power the wireless access module 310. The storage device may, for example, comprise an external power source, such as an AC adapter. In an embodiment, the wireless access module 310 may be powered only by the power received by the communications interface 314, or a combination of the power received by the communications interface 312 and the power received by the communications interface 314.

In an embodiment, the wireless access module 310 enables wireless access to a storage device when the communications interface 312 is connected to a power supply and the communications interface 314 is connected to the storage device. Thus, an electronic device may wirelessly access the storage device. For example, when the wireless access module 310 is powered by the communications interface 312, the wireless access module 310 can be configured to connect to a network. In an embodiment, if the electronic device is on the same network, then the electronic device may be permitted to access the storage device. In an embodiment, the electronic device may be required to be authenticated before access to the storage device is granted by the wireless access module 310. In such a case, the wireless access module 310 may be configured to authenticate the electronic device before granting wireless access to the storage device.

In an embodiment, the wireless access module 310 may comprise a button or switch which may be utilized to activate the wireless access module 310 before the wireless access module 310 will connect to a network. In an embodiment, the wireless access module 310 may comprise one or more indicators (not shown) which may be utilized to indicate when the wireless access module 310 is powered, trying to connect to the network, disconnected from the network, and/or connected to the network.

In an embodiment, the wireless access module 310 comprises a bridge unit which aids in providing wireless access to a storage device. In an embodiment, such a bridge unit comprises a USB bridge, Thunderbolt bridge, or other type. In an embodiment, the bridge unit can translate between two different protocols. For example, if a connected storage device communicates in a first protocol, but not a second protocol, the bridge unit may translate the second protocol to the first protocol, or vice versa.

In an embodiment, the wireless access module 310 enables wireless access to the storage device even when the communications interface 312 is connected to a host instead of a power supply. In such a case, the wireless access module 310 may be powered by the host. In an embodiment, the communications interface 312 may also enable direct access to the storage device. Therefore, the connected storage device may have both direct access and wireless access enabled. Alternatively, the wireless access module 310 may be configured to disable wireless access to the storage device when the communications interface 312 is connected to the host. Thus, while direct access to the storage device may be enabled by the communications interface 312, the wireless access module 310 may disable wireless access to the storage device.

In an embodiment, the wireless adapter device 300 is configured to work with only authorized storage devices. That is, the wireless adapter device 300 may authenticate a storage device before providing direct and/or wireless access to the storage device. In an embodiment, the authentication may ensure that only a storage device allowed to have direct or wireless access is connected to the wireless adapter device 300. In an embodiment, the authentication may ensure that only compatible storage devices are connected to the wireless adapter device 300. In an embodiment, the wireless access module 310 may provide such authentication of storage devices.

In an embodiment, the wireless adapter device 300 detects when the communications interface 314 is connected to a storage device. For example, the wireless access module 310 can detect when the communications interface 314 is connected to the storage device. In addition, the wireless adapter device 300 and/or wireless access module 310 may be configured to detect when the communications interface 312 is connected to a power supply. In an embodiment, wireless access to the storage device may be enabled when the communications interface 312 is connected to a power supply. The wireless adapter device 300 may further be configured to detect when the communications interface 312 is connected to a host device.

In an embodiment, the wireless access module 310 comprises one or more controllers to perform various operations disclosed above. Furthermore, in an embodiment, the wireless access module 310 comprises a non-transitory machine readable medium configured to store software which when executed by one or more controllers of the wireless access module 310, may cause the one or more controllers to perform one or more operations disclosed above.

Distributed Data Storage Operation

Figure 4:
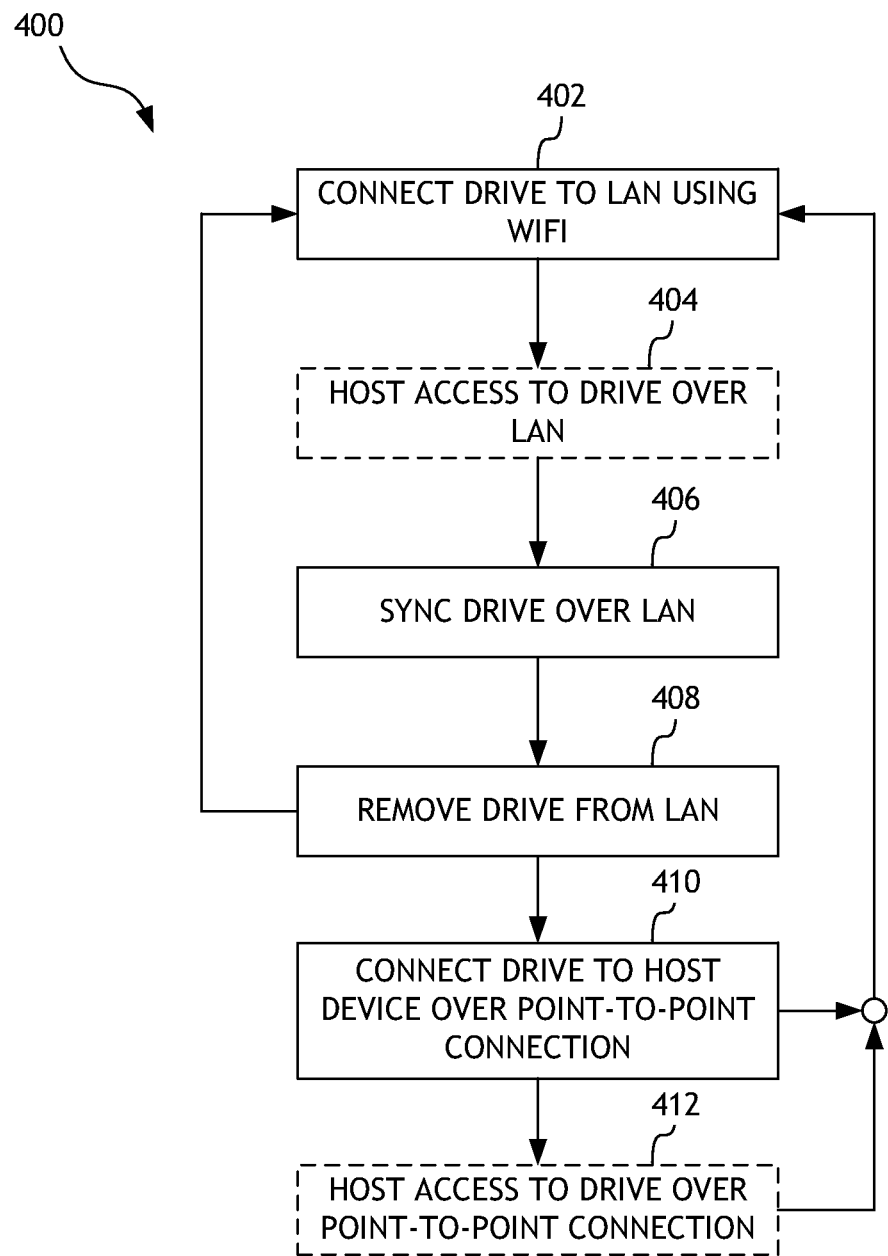
FIG. 4 is a flow diagram illustrating a process for managing data storage according to an embodiment.

FIG. 4 is a flow diagram illustrating a process 400 for managing data storage according to an embodiment. The process 400 may involve connecting a data storage drive to a local area network (LAN) at block 204. For example, the data storage drive may connect to the LAN wirelessly (e.g., using Wi-Fi). The data storage drive may be one of a plurality of data storage drives configured to connect to the LAN and share data among LAN-connected drives/devices. While connected to the LAN, one or more host devices may have access to data stored on the data storage drive.

At block 404, the data storage drive syncs with one or more other LAN-connected drives/devices and/or cloud-based services. Such syncing provides consistency/redundancy of data among distributed data storage drives, which can provide improved data security and/or access in certain embodiments. In certain embodiments, syncing settings/configurations may be set using a software application run on a LAN-connected host device. As data storage drives join, and are removed from, the LAN, one or more redundant files or file folders maintained in each of the drives are synced for consistency. For example, a shared folder of the data storage drive may be updated while the drive is removed from the LAN, wherein, when the drive is reconnected to the LAN, the shared folder is synced across the distributed storage drives that are connected to the LAN.

At block 408 of the process 400, the data storage drive is removed from the LAN. For example, the drive may be physically moved beyond the wireless broadcast range of the LAN, or may otherwise be disconnected from the network. While removed from the LAN, the drive may operate in a point-to-point "access-point-only" mode, wherein the drive may connect to a host over a point to point wired or wireless connection. For a host device, the point-to-point connection may provide improved streaming, or performance, with respect to accessing data on the drive as compared to accessing such data over a shared connection. While operating in an access-point-only mode, the data stored in a shared folder may be modified in some way. As shown in the figure, the process 400 may involve the drive being reintroduced into the LAN. Once the drive has rejoined the LAN, the modified data of the shared folder may be synced with other network-attached drives.

Additional Embodiments

Those skilled in the art will appreciate that in some embodiments, other types of distributed data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage system comprising:
a first data storage device configured to store data in one or more file directories, the first data storage device comprising a controller having a processor; and
a wireless transceiver device comprising a first cable portion, a second cable portion, and a wireless transceiver, the wireless transceiver device being communicatively coupled to the first data storage device via the first cable portion and connected to a power source via the second cable portion;
wherein the controller is configured to use the processor to:
in a first mode of operation:
synchronize at least one of the one or more file directories with a corresponding file directory of a second data storage device using the wireless transceiver device when the first data storage device and the second data storage device are connected over a broadcast connection in a first local area network (LAN); and
in a second mode of operation:
connect the first data storage device to one or more host devices over a dedicated point-to-point connection in a second LAN using the wireless transceiver device when the first data storage device is not connected to the first LAN.

2. The data storage system of claim 1, wherein the dedicated point-to-point connection is a Wi-Fi connection.

3. The data storage system of claim 1, wherein the controller is further configured to use the processor to, in the first mode of operation, provide access to the first data storage device by one or more host devices over the first LAN.

4. The data storage system of claim 1, wherein the controller is configurable by a host device over the first LAN or the second LAN using a software application.

5. The data storage system of claim 1, wherein the controller is configured to use the processor to synchronize the at least one of the one or more file directories without an Ethernet connection.

6. A data storage system comprising:
a plurality of data storage devices configured to be interconnected over a first Wi-Fi network using a plurality of wireless transceiver devices, each of the plurality of wireless transceiver devices being physically coupled to one of the plurality of data storage devices via a first cable portion of the respective wireless transceiver device, and connected to a respective power source via a second cable portion of the respective wireless transceiver device;
wherein each of the plurality of data storage devices is configured to use a respective processor to, in a first mode of operation, synchronize with other data storage devices of the plurality of data storage devices over the first Wi-Fi network; and
wherein each of the plurality of data storage devices is configured to be removed from the first Wi-Fi network and, while not connected to the first Wi-Fi network, communicate with one or more host devices over a dedicated point-to-point Wi-Fi network connection using a physically-coupled wireless transceiver device of the plurality of wireless transceiver devices in a second mode of operation.

7. The data storage system of claim 6, wherein each of the plurality of data storage devices is further configured to use the respective processor to synchronize with the other data storage devices by uploading data to the other data storage devices and/or downloading data from one or more of the other data storage devices.

8. The data storage system of claim 6, wherein the plurality of data storage devices are each further configured to use the respective processor to synchronize with the other data storage devices of the plurality of data storage devices without communicating with the other data storage devices over the Internet.

9. A method of managing data in a data storage device, the method comprising:
wirelessly connecting a first data storage device to a local area network (LAN) using a wireless transceiver device communicatively coupled to the first data storage device, the first data storage device being configured to store data in one or more file directories;
first synchronizing a first file directory of the one or more file directories with a corresponding file directory of a second data storage device over the LAN using the wireless transceiver device;
after said synchronizing the first file directory, removing the first data storage device from the LAN;
after said removing the first data storage device from the LAN, connecting the first data storage device to a host device over a point-to-point connection while the first data storage device is not connected to the LAN;
modifying the first file directory using the point-to-point connection;
after said modifying the first file directory, reconnecting the first data storage device to the LAN using the wireless transceiver device; and
second synchronizing the modified first file directory with the corresponding file directory of the second data storage device over the LAN;
wherein the wireless transceiver device comprises:
first and second cable portions;
a first connector configured to connect the wireless transceiver device to the first data storage device; and
a second connector configured to connect the wireless transceiver device to a power source.

10. The method of claim 9, further comprising providing access to the first data storage device by one or more host devices over the LAN.

11. The method of claim 9, further comprising configuring the first data storage device using a software application of a host device connected to the first data storage device over the LAN.

12. The method of claim 9, wherein said synchronizing the first file directory is performed without using an Ethernet connection.

\* \* \* \* \*